(12) United States Patent
Jung et al.

(10) Patent No.: US 10,698,184 B2
(45) Date of Patent: *Jun. 30, 2020

(54) OPTICAL IMAGING SYSTEM

(71) Applicant: SAMSUNG ELECTRO-MECHANICS CO., LTD., Suwon-si (KR)

(72) Inventors: Jin Hwa Jung, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,688

(22) Filed: Dec. 13, 2018

(65) Prior Publication Data

US 2019/0113718 A1 Apr. 18, 2019

Related U.S. Application Data

(63) Continuation of application No. 15/594,686, filed on May 15, 2017, now Pat. No. 10,185,127.

(30) Foreign Application Priority Data

Sep. 12, 2016 (KR) .................. 10-2016-0117304
Nov. 28, 2016 (KR) .................. 10-2016-0159277

(51) Int. Cl.
*G02B 13/18* (2006.01)
*G02B 3/02* (2006.01)
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ..... G02B 13/0045; G02B 13/002; G02B 9/64
See application file for complete search history.

(56) References Cited

U.S. PATENT DOCUMENTS

| | | | |
|---|---|---|---|
| 6,445,511 | B1 | 9/2002 | Kitahara |
| 9,146,380 | B2 | 9/2015 | Kubota et al. |
| 2002/0041451 | A1 | 4/2002 | Harada |
| 2011/0267705 | A1 | 11/2011 | Mihara et al. |
| 2011/0299179 | A1 | 12/2011 | Maetaki |

(Continued)

FOREIGN PATENT DOCUMENTS

| | | |
|---|---|---|
| CN | 102077128 A | 5/2011 |
| CN | 204065534 U | 12/2014 |

(Continued)

OTHER PUBLICATIONS

Chinese Office Action dated Oct. 9, 2019 in corresponding Chinese Patent Application No. 201710656993.1 (13 pages in English, 9 pages in Chinese).

(Continued)

*Primary Examiner* — Alicia M Harrington
(74) *Attorney, Agent, or Firm* — NSIP Law

(57) ABSTRACT

An optical imaging system includes a first lens, a second lens, a third lens, a fourth lens having a negative refractive power, a fifth lens having a negative refractive power, a sixth lens, and a seventh lens having a positive refractive power. The first lens to seventh lens are sequentially disposed in a direction from an object side toward an imaging plane.

18 Claims, 13 Drawing Sheets

(56) References Cited

U.S. PATENT DOCUMENTS

| | | |
|---|---|---|
| 2012/0212836 A1 | 8/2012 | Hsieh et al. |
| 2014/0376105 A1 | 12/2014 | Sekine |
| 2015/0198787 A1 | 7/2015 | Kubota et al. |
| 2016/0033742 A1 | 2/2016 | Huang |
| 2016/0187622 A1 | 6/2016 | Huang |
| 2017/0045714 A1 | 2/2017 | Huang |
| 2017/0227734 A1 | 8/2017 | Huang |
| 2018/0074298 A1 | 3/2018 | Jung et al. |
| 2019/0129150 A1* | 5/2019 | Tsai .................. G02B 13/0045 |

FOREIGN PATENT DOCUMENTS

| | | |
|---|---|---|
| CN | 207301458 U | 5/2018 |
| JP | H04-238311 A | 8/1992 |
| JP | 7-77654 A | 3/1995 |
| JP | H09-159911 A | 6/1997 |
| JP | 2012-181508 A | 9/2012 |
| JP | 2013-156459 A | 8/2013 |
| JP | 2015-132660 A | 7/2015 |

OTHER PUBLICATIONS

Chinese Office Action dated Mar. 16, 2020 in counterpart Chinese Patent Application No. 201710656993.1 (13 pages in English and 9 pages in Chinese).

\* cited by examiner

OPTICAL IMAGING SYSTEM

CROSS-REFERENCE TO RELATED APPLICATIONS

This application is a continuation of U.S. patent application Ser. No. 15/594,686 filed on May 15, 2017, now U.S. Pat. No. 10,185,127 issued on Jan. 22, 2019, which claims the benefit under 35 U.S.C. § 119(a) of Korean Patent Application Nos. 10-2016-0117304 filed on Sep. 12, 2016, and 10-2016-0159277 filed on Nov. 28, 2016, in the Korean Intellectual Property Office, the entire disclosures of which are incorporated herein by reference for all purposes.

BACKGROUND

1. Field

The following description relates to a telescopic optical imaging system including seven lenses.

2. Description of Related Art

Telescopic optical imaging systems capable of capturing images of distant objects may be significantly large. In detail, in terms of telescopic optical imaging systems, the ratio (TL/f) of the overall length TL of a telescopic optical imaging system to the overall focal length f may be greater than or equal to 1. Thus, it may be difficult to mount telescopic optical imaging systems in small electronic devices, such as portable terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens having a negative refractive power, a fifth lens having a negative refractive power, a sixth lens, and a seventh lens having a positive refractive power.

The first lens of the optical imaging system may have a convex image-side surface along an optical axis. The second lens of the optical imaging system can have a convex object-side surface along an optical axis. The third lens of the optical imaging system may have a convex object-side surface along an optical axis.

The fourth lens of the optical imaging system may have a meniscus form in which one side surface is concave along an optical axis, and the other side surface is convex along the optical axis. The fifth lens of the optical imaging system can have a concave object-side surface along an optical axis. The sixth lens of the optical imaging system may have opposing concave surfaces along an optical axis. The seventh lens of the optical imaging system can have opposing convex surfaces along an optical axis.

In another general aspect, an optical imaging system includes first to seventh lenses, sequentially disposed from an object side to an imaging plane, wherein a ratio (TL/f) of a distance TL from an object-side surface of the first lens to an imaging plane to an overall focal length f is less than or equal to 1.0.

The optical imaging system may satisfy the expression BFL/f<0.15, where BFL represents a distance from an image-side surface of the seventh lens to an imaging plane. The optical imaging system can satisfy the expression 0.1<f/(IMG HT)<2.5, where IMG HT is a half diagonal length of the imaging plane. The optical imaging system may satisfy the expression 1.5<Nd7<1.7, where Nd7 represents a refractive index of the seventh lens.

The optical imaging system may satisfy the expression −45<f5/f<45, where f5 represents a focal length of a fifth lens. The optical imaging system can satisfy the expression 2.0<f/EPD<2.8, where EPD represents a diameter of an entrance pupil. The second lens, fourth lens, and sixth lens of the optical imaging system may each have a negative refractive power. The sixth lens of the optical imaging system can have a concave object-side surface along an optical axis.

In another general aspect, an optical imaging system includes a first lens having a positive refractive power and a convex object-side surface along an optical axis, a second lens having a concave image-side surface along the optical axis, a third lens, a fourth lens, a fifth lens, a sixth lens, and a seventh lens. The first lens to seventh lens are sequentially disposed from an object side to an imaging plane. One or both surfaces of each of the first to seventh lenses are aspherical.

The object-side surface of the first lens of the optical imaging system may include a most convex point of the system. The image-side surface of the second lens of the optical imaging system can include a most concave point of the system. The third lens of the optical imaging system may have a meniscus form in which one side surface is concave and the other side surface is convex. The fifth lens of the optical imaging system can have a convex image-side surface. The seventh lens of the optical imaging system may be bi-convex with a positive refractive power or may be bi-concave with a negative refractive power.

In another general aspect, an optical imaging system includes a first lens to a seventh lens. The first lens and the seventh lens each have a positive refractive power, a convex object-side surface along an optical axis and a convex image-side surface along the optical axis. The first lens to seventh lens are sequentially disposed from an object side to an imaging plane.

The object-side surface of the first lens of the optical imaging system may include a most convex point of the optical imaging system. The second lens to sixth lens of the optical imaging system can each have a negative refractive power. The image-side surface of the second lens of the optical imaging system may be concave and may have a most concave point of the optical imaging system.

Other features and aspects will be apparent from the following detailed description, the drawings, and the claims.

BRIEF DESCRIPTION OF THE DRAWINGS

FIG. 3 is a table listing aspherical characteristics of the optical imaging system illustrated in FIG. 1.

FIG. 6 is a table listing aspherical characteristics of the optical imaging system illustrated in FIG. 4.

FIG. 9 is a table listing aspherical characteristics of the optical imaging system illustrated in FIG. 7.

FIG. 12 is a table listing aspherical characteristics of the optical imaging system illustrated in FIG. 10.

Figure 1:
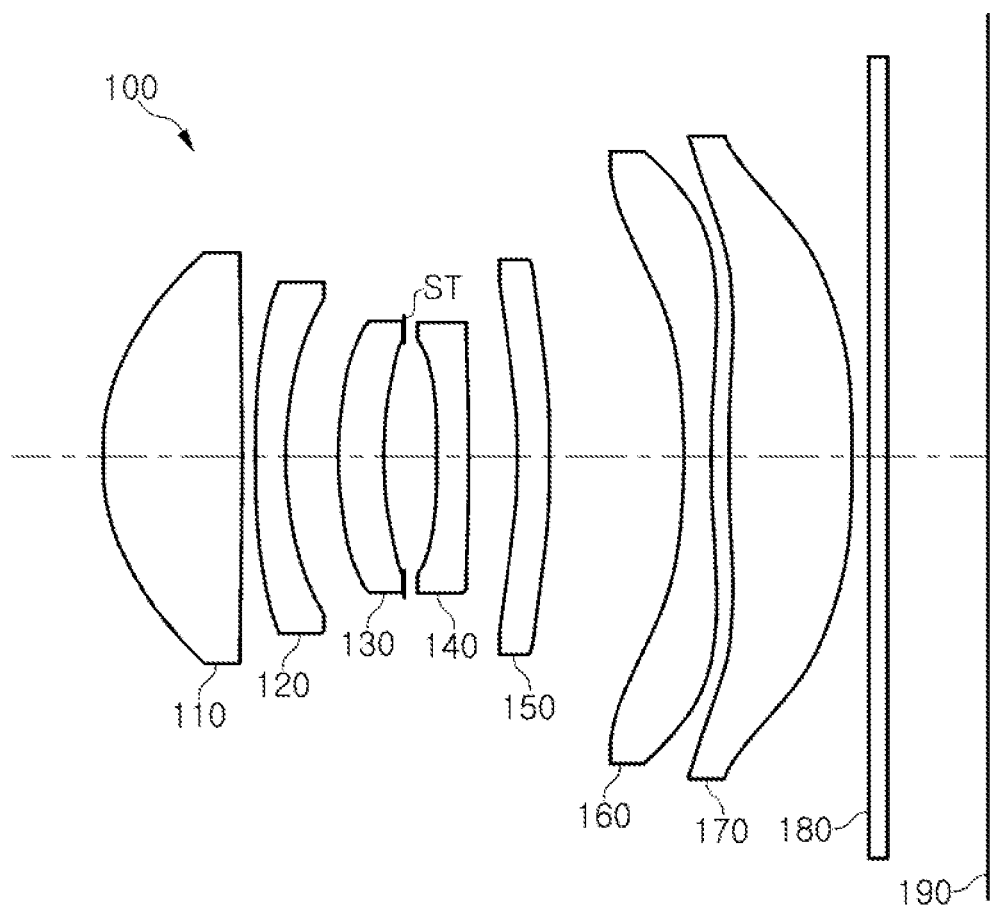
FIG. 1 is a diagram of an optical imaging system according to a first example.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

Hereinafter, examples will be described as follows with reference to the attached drawings. Examples provide an optical imaging system capable of capturing images of distant objects and being mounted in a small terminal. The disclosure may, however, be exemplified in many different forms and should not be construed as being limited to the specific embodiments set forth herein. Rather, these embodiments are provided so that this disclosure will be thorough and complete, and will fully convey the scope of the disclosure after an understanding of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

According to an example, a first lens refers to a lens closest to an object or a subject of which an image is captured. A seventh lens refers to a lens closest to an imaging plane or an image sensor. In the present specification, an entirety of a radius of curvature, a thickness, a distance from an object-side surface of a first lens to an imaging plane (TL), a half diagonal length of the imaging plane (IMG HT), and a focal length of a lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

In a description of a form of a lens, a surface of a lens being convex means that an optical axis portion of a corresponding surface is convex, while a surface of a lens being concave means that an optical axis portion of a corresponding surface is concave. Therefore, in a configuration in which a surface of a lens is described as being convex, an edge portion of the lens may be concave. In a manner the same as the case described above, even in a configuration in which a surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include seven lenses with a refractive power. However, the number of lenses in the optical system may vary, for example, between two to seven lenses, while achieving the various results and benefits described below. Also, although each lens is described with a particular refractive power, a different refractive power for at least one of the lenses may be used to achieve the intended result.

An optical imaging system includes seven lenses. For example, the optical imaging system may include the first lens, a second lens, a third lens, a fourth lens, a fifth lens, a sixth lens, and the seventh lens, sequentially disposed from an object side.

The first lens has a refractive power. For example, the first lens has a positive refractive power. The first lens has at least one convex surface. In an embodiment, the first lens has a convex object-side surface.

The first lens has an aspherical surface. For example, both surfaces of the first lens are aspherical. The first lens may be formed using a material having a relatively high degree of light transmittance and excellent workability. In an example, the first lens is formed using a plastic material. However, a material of the first lens is not limited to being a plastic material. In another example, the first lens may be formed using a glass material. The first lens has a relatively low refractive index. For example, a refractive index of the first lens is less than 1.6.

The second lens has a refractive power. For example, the second lens has a negative refractive power. The second lens has a convex surface. In an embodiment, the second lens may have a convex object-side surface.

The second lens has an aspherical surface. For example, the second lens has an aspherical object-side surface. The second lens may be formed using a material having a relatively high degree of light transmittance and excellent workability. In an example, the second lens is formed using a plastic material. However, a material of the second lens is not limited to being plastic. In another example, the second lens may be formed using a glass material. The second lens has a reflective index higher than that of the first lens. For example, a refractive index of the second lens is greater than or equal to 1.65.

The third lens has a refractive power. For example, the third lens may have a positive or a negative refractive power. The third lens has a meniscus form in which one surface is concave, and the other surface is convex. In embodiments, the third lens has a form in which an object-side surface is convex and an image-side surface is concave, or has a form in which the object-side surface is concave and the image-side surface is convex.

The third lens has an aspherical surface. For example, the third lens has an aspherical image-side surface. The third lens may be formed using a material having a relatively high degree of light transmittance and excellent workability. In an example, the third lens is formed using a plastic material. However, a material of the third lens is not limited to being plastic. In another example, the third lens may be formed using a glass material. The third lens has a refractive index substantially similar to that of the first lens. In detail, the refractive index of the third lens is less than 1.6.

The fourth lens has a refractive power. For example, the fourth lens has a negative refractive power. The fourth lens has the meniscus form in which one surface is concave and the other surface is convex. In embodiments, the fourth lens has a form in which an object-side surface is convex and an image-side surface is concave, or has a form in which the object-side surface is concave and the image-side surface is convex.

The fourth lens has an aspherical surface. For example, both surfaces of the fourth lens are aspherical. The fourth lens may be formed using a material having a relatively high degree of light transmittance and excellent workability. In an example, the fourth lens is formed using a plastic material. However, a material of the fourth lens is not limited to being plastic. In another example, the fourth lens may be formed using a glass material. The fourth lens has a refractive index greater than or equal to that of the first lens.

The fifth lens has a refractive power. For example, the fifth lens may have a positive or a negative refractive power. The fifth lens has a concave surface. In an embodiment, the fifth lens has a concave object-side surface.

The fifth lens has an aspherical surface. For example, both surfaces of the fifth lens are aspherical. The fifth lens may be formed using a material having a relatively high degree of light transmittance and excellent workability. In an example, the fifth lens is formed using a plastic material. However, a material of the fifth lens is not limited to being plastic. In another example, the fifth lens may be formed using a glass material. The fifth lens has a refractive index higher than that of the first lens. In an embodiment, the refractive index of the fifth lens is greater than or equal to 1.6.

The sixth lens has a refractive power. For example, the sixth lens has a negative refractive power. The sixth lens may have a concave surface. For example, the sixth lens has a concave object-side surface. The sixth lens may have an inflection point. In an embodiment, the sixth lens includes one or more inflection points formed on opposing surfaces.

The sixth lens has an aspherical surface. For example, both surfaces of the sixth lens are aspherical. The sixth lens may be formed using a material having a relatively high degree of light transmittance and excellent workability. In an example, the sixth lens is formed using a plastic material. However, a material of the sixth lens is not limited to being plastic. In another example, the sixth lens may be formed using a glass material. The sixth lens has a refractive index substantially similar to that of the first lens. In an embodiment, the refractive index of the sixth lens is less than 1.6.

The seventh lens has a refractive power. For example, the seventh lens has a positive or a negative refractive power. The seventh lens may have opposing surfaces formed substantially in a symmetrical manner. For example, the seventh lens may have a convex object-side surface or opposing concave surfaces. The seventh lens may include an inflection point. In an embodiment, the seventh lens includes one or more inflection points formed on opposing surfaces.

The seventh lens may have an aspherical surface. For example, both surfaces of the seventh lens are aspherical. The seventh lens may be formed using a material having a relatively high degree of light transmittance and excellent workability. In an example, the seventh lens is formed using a plastic material. However, a material of the seventh lens is not limited to being plastic. In another example, the seventh lens may be formed using a glass material. The seventh lens has a refractive index lower than that of the first lens. In an embodiment, the refractive index of the seventh lens is less than 1.53.

Aspherical surfaces of the first to seventh lenses may be expressed using Formula 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad \text{Formula 1}$$

In Formula 1, c represents an inverse of a radius of curvature of a lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system further includes a filter, an image sensor, and a stop. The filter is disposed between the seventh lens and the image sensor. The filter may block a portion of wavelengths of visible light, in order to generate a clear image. For example, the filter blocks light of an infrared wavelength.

The image sensor forms an imaging plane. For example, a surface of the image sensor may form the imaging plane. The stop is disposed to adjust an amount of light incident on a lens. In detail, the stop may be interposed between the second lens and the third lens or between the third lens and the fourth lens.

The optical imaging system satisfies the following Conditional Equations:

$0.7 < TL/f < 1.0$            [Conditional Equation 1]

$BFL/f < 0.15$            [Conditional Equation 2]

$0.1 < f/(IMG\ HT) < 2.5$            [Conditional Equation 3]

$1.5 < Nd7 < 1.7$            [Conditional Equation 4]

$-45 < f5/f < 45$            [Conditional Equation 5]

$2.0 < f/EPD < 2.8$            [Conditional Equation 6]

In the Conditional Equations, TL represents a distance from the object-side surface of the first lens to an imaging plane, f represents an overall focal length of the optical imaging system, BFL represents a distance from an image-side surface of the seventh lens to an imaging plane, and IMG HT represents a half diagonal length of the imaging plane. Nd7 represents a refractive index of the seventh lens, f5 represents a focal length of the fifth lens, and EPD represents a diameter of an entrance pupil.

Conditional Equation 1 is provided for the miniaturization of the optical imaging system. In detail, in cases in which the optical imaging system is beyond an upper limit value of Conditional Equation 1, it may be difficult to miniaturize the optical imaging system, so that it may be difficult to mount the optical imaging system in a portable terminal. In cases in which the optical imaging system is below a lower limit value of Conditional Equation 1, it may be difficult to manufacture the optical imaging system.

Conditional Equation 2 is provided for mounting the optical imaging system in a portable terminal. In detail, ease of manufacturing the optical imaging system beyond an upper limit value of Conditional Equation 2 is facilitated, but resolution of the optical imaging system may be relatively low.

Conditional Equation 3 is a parametric ratio for maintaining telescopic characteristics and relatively high resolution. In detail, the optical imaging system beyond an upper limit of Conditional Equation 3 may have excellent telescopic characteristics, but it may be difficult to implement relatively high resolution. The optical imaging system below a lower limit of Conditional Equation 3 may implement a relatively wide angle of view, but may have relatively poor telescopic characteristics.

Conditional Equation 4 is provided as a parameter of the seventh lens for a high-resolution optical imaging system. In detail, because the seventh lens satisfying a numerical range of Conditional Equation 4 has a relatively low Abbe number (less than or equal to 26), ease of correction of astigmatism, longitudinal chromatic aberrations, and chromatic aberrations of magnification is facilitated.

Conditional Equation 5 is provided as a parametric ratio of the fifth lens for a high-resolution optical imaging system. In detail, in cases in which the fifth lens is outside of a numerical range of Conditional Equation 5, the fifth lens may increase aberrations, so that it may be difficult to provide a high-resolution optical system. Conditional Equation 6 is provided as a numerical range of an F number for a high-resolution optical imaging system.

In the optical imaging system, a lens having a relatively high degree of positive refractive power may be disposed to be adjacent to an object. In detail, the first lens in the optical imaging system has the highest degree of positive refractive power. In the optical imaging system, a lens having a relatively high degree of negative refractive power may be disposed to be substantially adjacent to the imaging plane. In embodiments, the sixth lens has the highest degree of negative refractive power. However, in cases in which the seventh lens has a negative refractive power, the second lens may have the highest degree of negative refractive power.

In the optical imaging system, a relatively high degree of refractive power of a lens (an inverse value of a focal length) may be distributed in an object side and an image side. For example, in the optical imaging system, the first lens and the seventh lens may have relatively high degrees of refractive power, while the third lens, the fourth lens, and the fifth lens may have relatively low degrees of refractive power.

The first lens in the optical imaging system may have a surface including the most convex point of the system. In detail, the object-side surface of the first lens includes the most convex point. The second lens in the optical imaging system may have substantially a surface including the most concave point of the system. In embodiments, an image-side surface of the second lens includes the most concave point.

In the optical imaging system, the third lens may have substantially a refractive index similar to that of the sixth lens. For example, in cases in which the refractive index of the third lens is less than or equal to 1.55, the refractive index of the sixth lens is less than or equal to 1.55. In cases in which the refractive index of the third lens is more than or equal to 1.65, the refractive index of the sixth lens is more than or equal to 1.65. In a manner similar to the case described above, in the optical imaging system the fourth lens may have substantially a refractive index similar to that of the seventh lens. For example, in cases in which the refractive index of the fourth lens is less than or equal to 1.55, the refractive index of the seventh lens is less than or equal to 1.55. In cases in which the refractive index of the fourth lens is more than or equal to 1.64, the refractive index of the seventh lens is more than or equal to 1.64.

A focal length of lenses forming the optical imaging system may be selected from within a predetermined range. In an example, a focal length of the first lens is selected from within a range of 2.2 mm to 2.8 mm, a focal length of the second lens is selected from within a range of −7.0 mm to −3.0 mm, a focal length of the fourth lens is selected from within a range of −16 mm to −5.0 mm, and a focal length of the sixth lens is selected from within a range of −28 mm to −3.0 mm.

In the optical imaging system, effective diameters of lenses may be different. As an example, an effective diameter of the first lens is greater than that of the second lens. An effective diameter of the second lens may be greater than that of the third lens. In an embodiment, an effective diameter of the third lens is greater than or substantially similar to that of the fourth lens. In another example, an effective diameter of the fifth lens is greater than that of the fourth lens and less than that of the sixth lens. An effective diameter of the sixth lens may be greater than that of the fifth lens and less than that of the seventh lens.

In the optical imaging system, thicknesses of lenses may be different. In detail, among the first to seventh lenses, the first lens is the thickest, while the fourth lens or the fifth lens may be the thinnest. Odd-numbered lens may be substantially thicker than lenses disposed adjacently thereto. For example, the first lens is thicker than the second lens, while the third lens is thicker than the second lens and the fourth lens.

Distances between lenses in the optical imaging system may be different. Distances between lenses may be gradually reduced in directions away from the fourth lens and the fifth lens. For example, in the optical imaging system, a distance between the fourth lens and the fifth lens or a distance between the fifth lens and the sixth lens are longer than that between other lenses. Similarly in this configuration, a distance between the first lens and the second lens or a distance between the seventh lens and an imaging plane is less than that between other lenses.

Subsequently, an optical imaging system according to various examples will be described. First of all, the optical imaging system according to a first example will be described with reference to FIG. 1. An optical imaging system 100 includes a first lens 110, a second lens 120, a third lens 130, a fourth lens 140, a fifth lens 150, a sixth lens 160, and a seventh lens 170.

The first lens 110 has a positive refractive power and opposing convex surfaces. The second lens 120 has a negative refractive power, a convex object-side surface, and a concave image-side surface. The third lens 130 has a negative refractive power, a convex object-side surface, and a concave image-side surface. The fourth lens 140 has a negative refractive power, a concave object-side surface, and a convex image-side surface.

The fifth lens 150 has a negative refractive power, a concave object-side surface, and a convex image-side surface. The sixth lens 160 has a negative refractive power and opposing concave surfaces. In addition, the sixth lens 160 includes inflection points formed on opposing surfaces. The seventh lens 170 has a positive refractive power and opposing convex surfaces. In addition, the seventh lens 170 includes inflection points formed on opposing surfaces.

In the configuration described above, first lens 110 has the highest degree of positive refractive power, while sixth lens 160 has the highest degree of negative refractive power. In the example described above, an object-side surface of first lens 110 is more convex than surfaces of other lenses, while the image-side surface of second lens 120 is more concave than surfaces of other lenses. In the configuration described above, a paraxial region of first lens 110 is formed to be thicker than paraxial regions of other lenses. A paraxial region of fourth lens 140 is formed to be thinner than paraxial regions of other lenses. In the example described above, a distance between fifth lens 150 and sixth lens 160 is longer than that between other lenses. A distance between first lens 110 and second lens 120 may be shorter than that between other lenses.

The optical imaging system 100 further includes a filter 180, an image sensor 190, and a stop ST. Filter 180 is interposed between seventh lens 170 and image sensor 190, while stop ST is interposed between third lens 130 and fourth lens 140.

In optical imaging system 100, first lens 110 and seventh lens 170 may have a higher degree of refractive power than that of other lenses. In a manner different from the embodiments described above, third lens 130, fourth lens 140, and fifth lens 150 may have a lower degree of refractive power than that of other lenses.

A refractive index of first lens 110, a refractive index of third lens 130, and a refractive index of sixth lens 160, in optical imaging system 100, may be less than or equal to 1.55. In this case, the refractive index of first lens 110 is substantially the same as that of the third lens 130. The refractive index of second lens 120, the refractive index of fourth lens 140, the refractive index of fifth lens 150, and the refractive index of seventh lens 170, in optical imaging system 100, may be higher than or equal to 1.64. In this case, the refractive index of fourth lens 140 is substantially the same as that of fifth lens 150. In optical imaging system 100, second lens 120 may have substantially the highest refractive index, while first lens 110 may have substantially the lowest refractive index.

An effective diameter of a lens in optical imaging system 100 may be gradually reduced in a direction toward stop ST. For example, an effective diameter of third lens 130 or fourth lens 140, disposed adjacently to stop ST, may be smaller than that of lenses adjacent thereto. In a manner consistent with the case described above, a lens disposed distantly from stop ST may have a relatively large effective diameter. For example, seventh lens 170 disposed farthest from stop ST may has the largest effective diameter.

Figure 2:
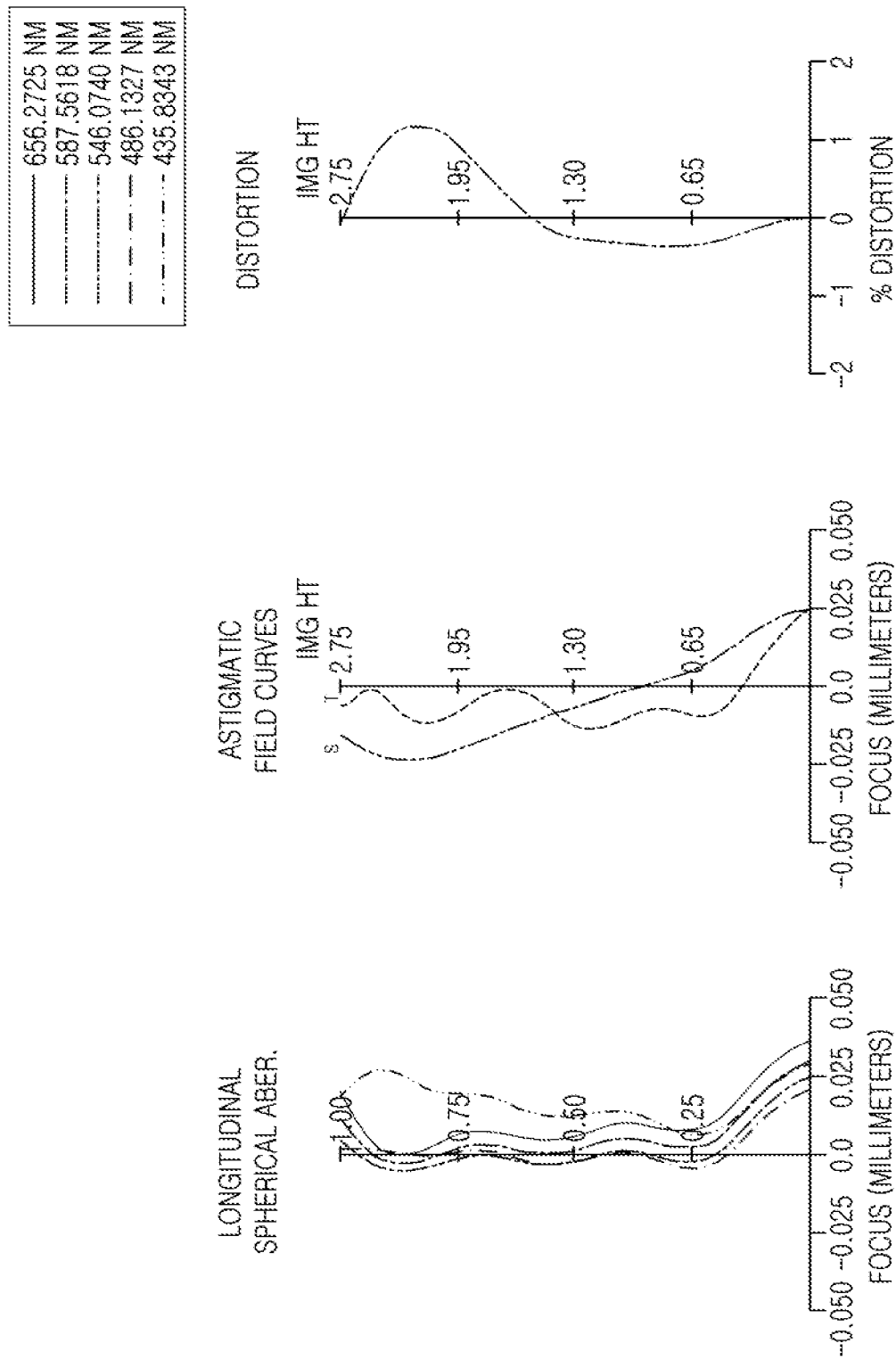
FIG. 2 is a set of graphs illustrating aberration curves of the optical imaging system illustrated in FIG. 1.
Figure 3:
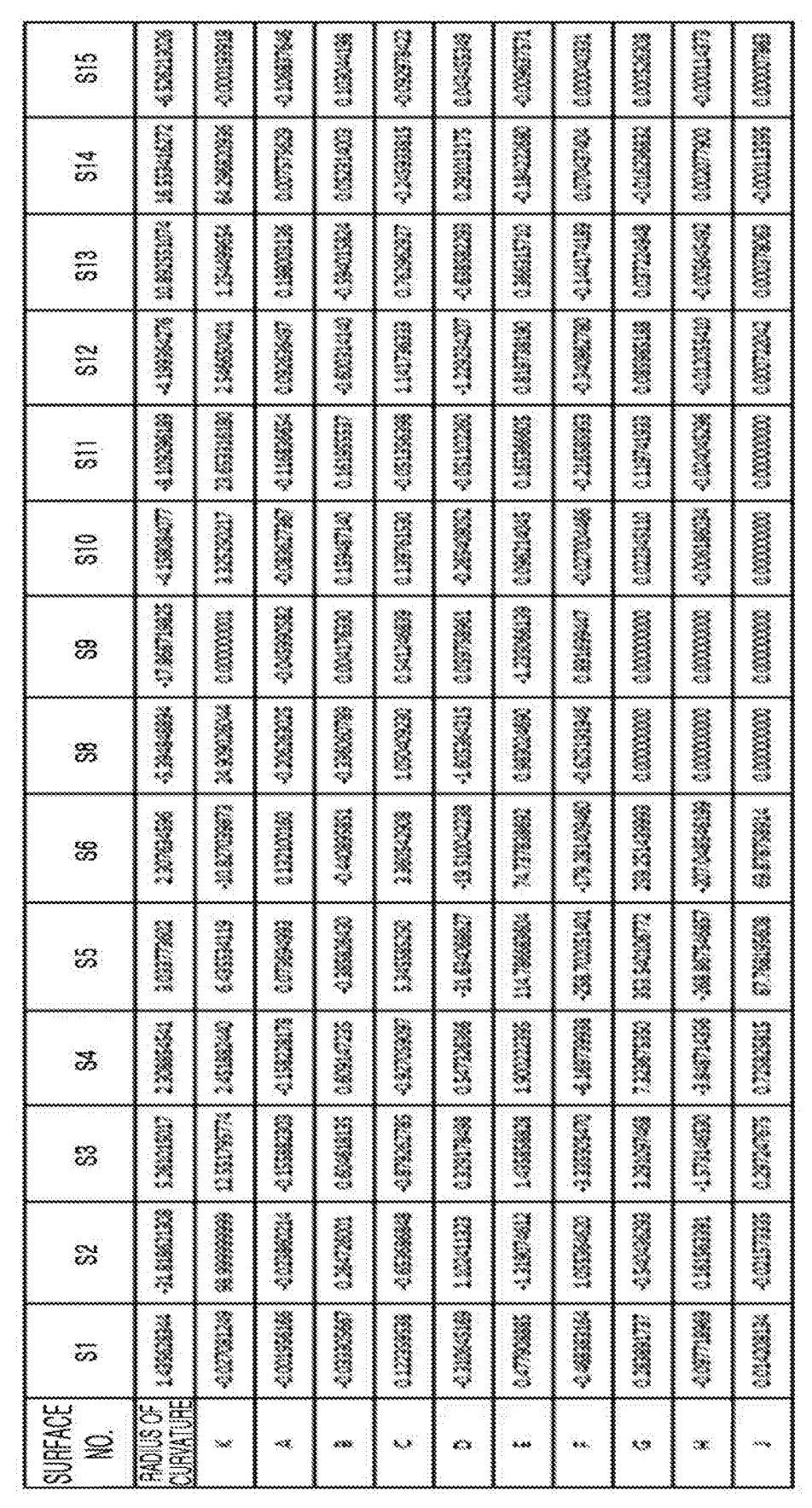

An optical imaging system having the configuration described above has aberration characteristics as illustrated in the graphs of FIG. 2. FIG. 3 lists aspherical characteristics of the optical imaging system according to the example. Table 1 lists lens characteristics of the optical imaging system according to the example.

TABLE 1

| | First Example | | | | | |
| --- | --- | --- | --- | --- | --- | --- |
| | | f = 5.9976 | | TL = 5.195 | | |
| | IMG HT = 2.75 | Radius of | Thickness/ | Focal | Refractive | Abbe |
| Surface No. | | Curvature | Distance | Length | Index | Number |
| S1 | First Lens | 1.4300 | 0.7860 | 2.580 | 1.537 | 55.8 |
| S2 | | −31.8100 | 0.1000 | | | |
| S3 | Second Lens | 5.2600 | 0.1800 | −6.310 | 1.684 | 20.4 |
| S4 | | 2.3000 | 0.3080 | | | |
| S5 | Third Lens | 3.0300 | 0.2610 | −20.520 | 1.537 | 55.8 |
| S6 | | 2.3000 | 0.1210 | | | |
| S7 | Stop | infinity | 0.1960 | | | |
| S8 | Fourth Lens | −5.4000 | 0.1600 | −12.120 | 1.641 | 23.9 |
| S9 | | −17.8700 | 0.3100 | | | |
| S10 | Fifth Lens | −4.1600 | 0.1900 | −13.570 | 1.641 | 23.9 |
| S11 | | −8.1100 | 0.7890 | | | |

TABLE 1-continued

First Example f = 5.9976  TL = 5.195

| Surface No. | | Radius of Curvature | Thickness/ Distance | Focal Length | Refractive Index | Abbe Number |
|---|---|---|---|---|---|---|
| IMG HT = 2.75 | | | | | | |
| S12 | Sixth Lens | −4.2000 | 0.1640 | −5.520 | 1.546 | 56.0 |
| S13 | | 10.8900 | 0.1080 | | | |
| S14 | Seventh Lens | 16.5500 | 0.7220 | 7.210 | 1.657 | 21.5 |
| S15 | | −6.5300 | 0.1000 | | | |
| S16 | Filter | infinity | 0.1100 | | 1.519 | 64.2 |
| Imaging Plate | | infinity | 0.5900 | | | |

Figure 4:
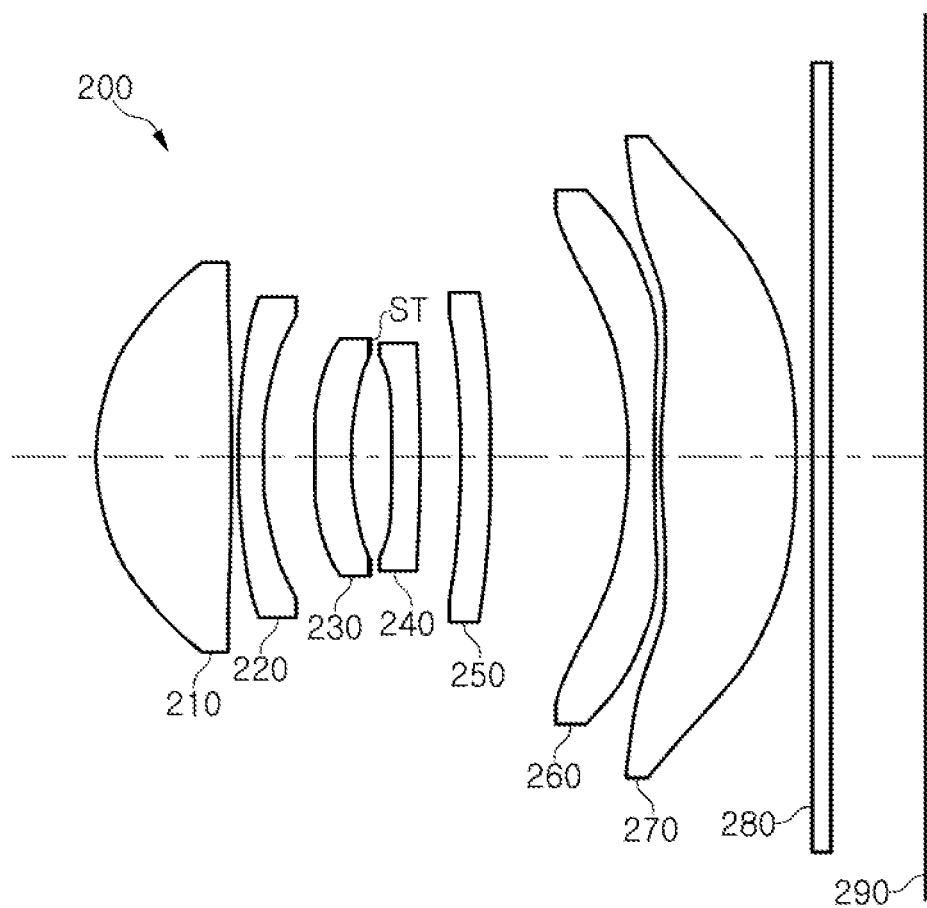
FIG. 4 is a diagram of an optical imaging system according to a second example.

An optical imaging system according to a second example will be described with reference to FIG. 4. An optical imaging system 200 includes a first lens 210, a second lens 220, a third lens 230, a fourth lens 240, a fifth lens 250, a sixth lens 260, and a seventh lens 270.

The first lens 210 has a positive refractive power and opposing convex surfaces. The second lens 220 has a negative refractive power, a convex object-side surface, and a concave image-side surface. The third lens 230 has a negative refractive power, a convex object-side surface, and a concave image-side surface. The fourth lens 240 has a negative refractive power, a concave object-side surface, and a convex image-side surface.

The fifth lens 250 has a negative refractive power, a concave object-side surface, and a convex image-side surface. The sixth lens 260 has a negative refractive power and opposing concave surfaces. In addition, the sixth lens 260 includes inflection points formed on opposing surfaces. The seventh lens 270 has a positive refractive power and opposing convex surfaces. In addition, the seventh lens 270 includes inflection points formed on opposing surfaces.

In the configuration described above, first lens 210 has the highest degree of positive refractive power, while sixth lens 260 has the highest degree of negative refractive power. In the example described above, an object-side surface of first lens 210 is more convex than surfces of other lenses, while the image-side surface of third lens 230 is more concave than surfaces of other lenses. In the configuration described above, a paraxial region of first lens 210 is formed to be thicker than paraxial regions of other lenses. A paraxial region of the fourth lens 240 may be formed to be thinner than paraxial regions of other lenses. In the example described above, a distance between fifth lens 250 and sixth lens 260 is longer than that between other lenses. A distance between first lens 210 and second lens 220 may be shorter than that between other lenses.

The optical imaging system 200 further includes a filter 280, an image sensor 290, and a stop ST. Filter 280 is interposed between seventh lens 270 and image sensor 290, while stop ST is interposed between third lens 230 and fourth lens 240.

In the optical imaging system 200, first lens 210 and seventh lens 270 may have a higher degree of refractive power than that of other lenses. In a manner different from the embodiments described above, third lens 230, fourth lens 240, and fifth lens 250 may have a lower degree of refractive power than that of other lenses.

A refractive index of first lens 210, a refractive index of third lens 230, and a refractive index of sixth lens 260, in optical imaging system 200, may be less than or equal to 1.55. In this case, the refractive index of first lens 210 is substantially the same as that of third lens 230. The refractive index of second lens 220, the refractive index of fourth lens 240, the refractive index of fifth lens 250, and the refractive index of seventh lens 270, in optical imaging system 200, may be higher than or equal to 1.64. In this case, the refractive index of fourth lens 240 is substantially the same as that of fifth lens 250. In optical imaging system 200, second lens 220 may have substantially the highest refractive index, while first lens 210 may have substantially the lowest refractive index.

An effective diameter of a lens in optical imaging system 200 may be gradually reduced in a direction toward stop ST. For example, an effective diameter of fourth lens 240 disposed adjacently to stop ST is smaller than that of lenses adjacent thereto. In a manner consistent with the embodiment described above, a lens disposed distantly from stop ST may have a relatively large effective diameter. For example, seventh lens 270 disposed farthest from stop ST has the largest effective diameter.

Figure 5:
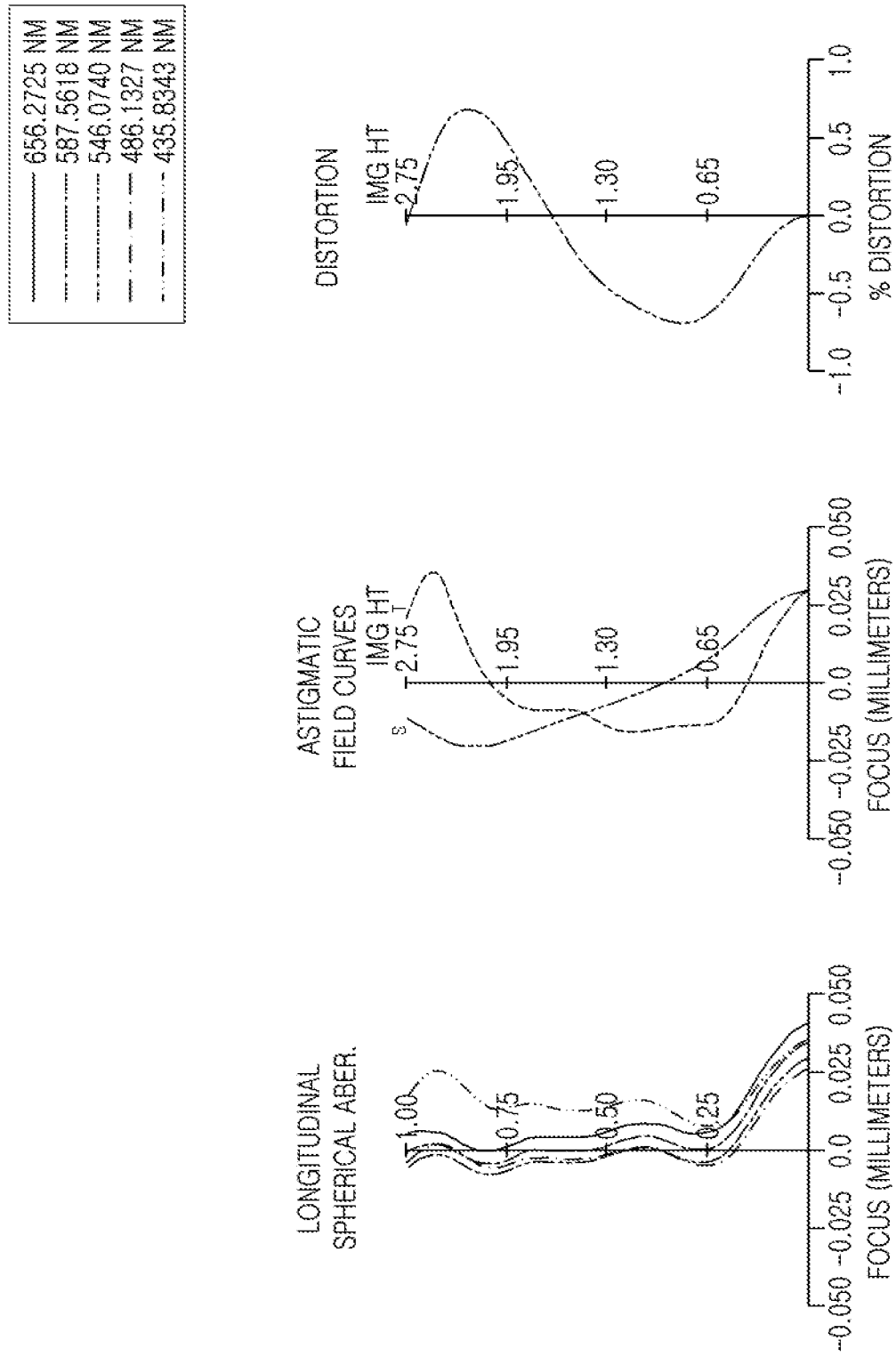
FIG. 5 is a set of graphs illustrating aberration curves of the optical imaging system illustrated in FIG. 4.
Figure 6:
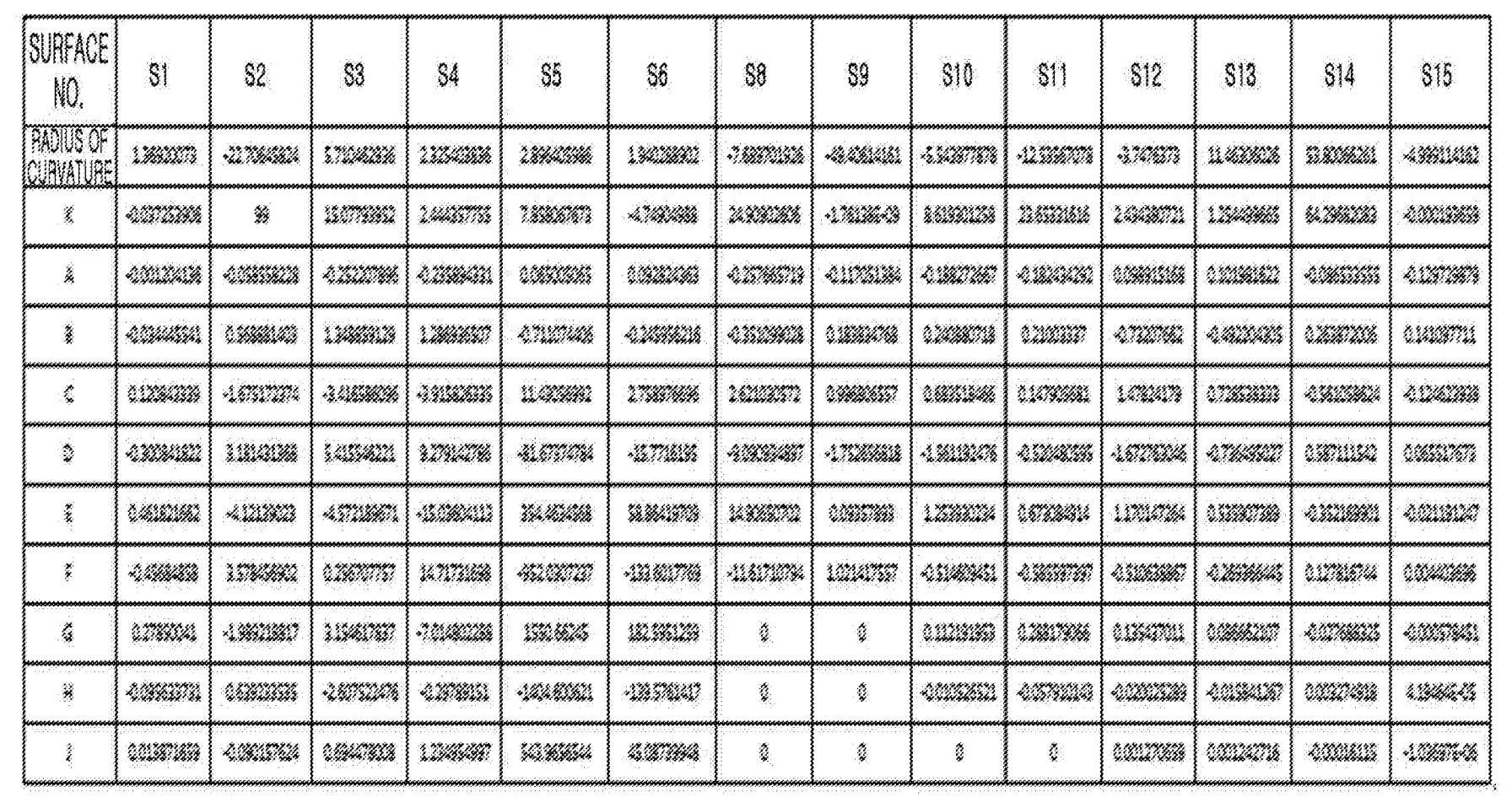

An optical imaging system having the configuration described above represents aberration characteristics as illustrated in the graphs of FIG. 5. FIG. 6 lists aspherical characteristics of the optical imaging system according to the example. Table 2 lists lens characteristics of the optical imaging system according to the example.

TABLE 2

Second Example f = 5.9976  TL = 5.149

| Surface No. | | Radius of Curvature | Thickness/ Distance | Focal Length | Refractive Index | Abbe Number |
|---|---|---|---|---|---|---|
| IMG HT = 2.75 | | | | | | |
| S1 | First Lens | 1.3700 | 0.8040 | 2.430 | 1.537 | 55.8 |
| S2 | | −22.7100 | 0.0800 | | | |
| S3 | Second Lens | 5.7100 | 0.1500 | −5.980 | 1.684 | 20.4 |
| S4 | | 2.3300 | 0.3180 | | | |

TABLE 2-continued

Second Example

| | | f = 5.9976 | | TL = 5.149 | | |
|---|---|---|---|---|---|---|
| IMG HT = 2.75 | | Radius of | Thickness/ | Focal | Refractive | Abbe |
| Surface No. | | Curvature | Distance | Length | Index | Number |
| S5 | Third Lens | 2.9000 | 0.2300 | −11.950 | 1.537 | 55.8 |
| S6 | | 1.9400 | 0.1120 | | | |
| S7 | Stop | infinity | 0.1450 | | | |
| S8 | | −7.6900 | 0.1500 | −14.230 | 1.641 | 23.9 |
| | Fourth Lens | | | | | |
| S9 | | −49.4100 | 0.2780 | | | |
| S10 | Fifth Lens | −5.5400 | 0.1830 | −5.670 | 1.641 | 23.9 |
| S11 | | −12.5400 | 0.8500 | | | |
| S12 | Sixth Lens | −3.7500 | 0.1570 | −5.150 | 1.546 | 56.0 |
| S13 | | 11.4600 | 0.1000 | | | |
| S14 | Seventh Lens | 53.8000 | 0.7920 | 7.000 | 1.657 | 21.5 |
| S15 | | −5.0000 | 0.1000 | | | |
| S16 | Filter | infinity | 0.1100 | | 1.519 | 64.2 |
| Imaging Plate | | infinity | 0.5900 | | | |

Figure 7:
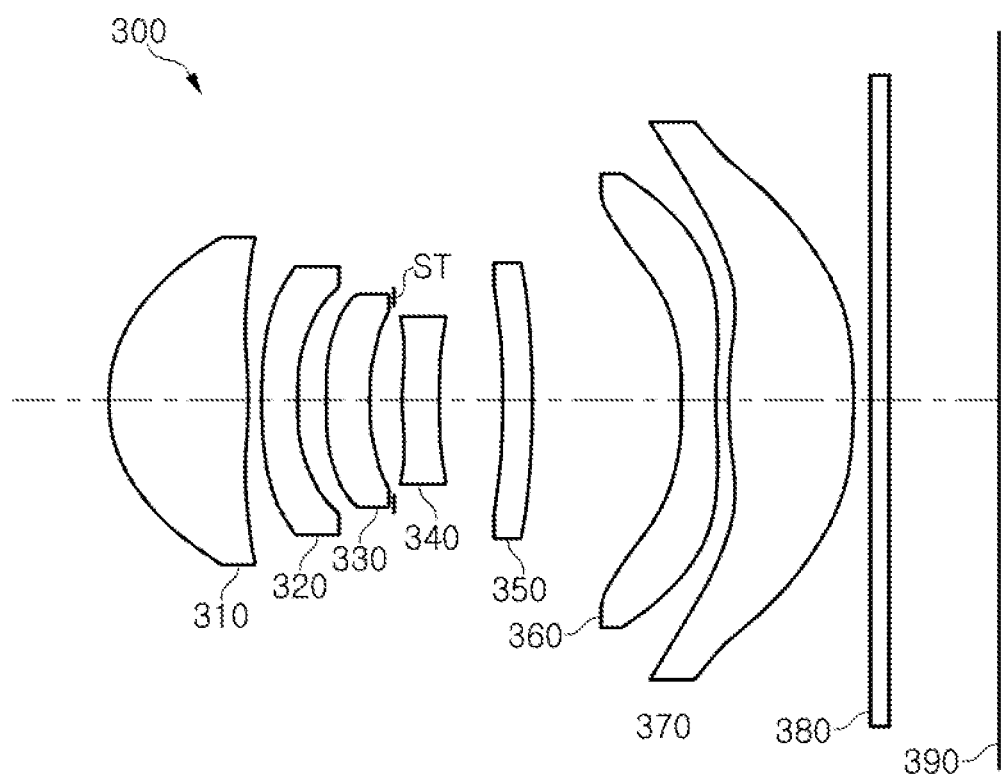
FIG. 7 is a diagram of an optical imaging system according to a third example.

An optical imaging system according to a third example will be described with reference to FIG. 7. An optical imaging system 300 includes a first lens 310, a second lens 320, a third lens 330, a fourth lens 340, a fifth lens 350, a sixth lens 360, and a seventh lens 370.

The first lens 310 has a positive refractive power and opposing convex surfaces. The second lens 320 has a negative refractive power, a convex object-side surface, and a concave image-side surface. The third lens 330 has a negative refractive power, a convex object-side surface, and a concave image-side surface. The fourth lens 340 has a negative refractive power, a convex object-side surface, and a concave image-side surface.

The fifth lens 350 has a negative refractive power, a concave object-side surface, and a convex image-side surface. The sixth lens 360 has a negative refractive power and opposing concave surfaces. In addition, the sixth lens 360 includes inflection points formed on opposing surfaces. The seventh lens 370 has a positive refractive power and opposing convex surfaces. In addition, the seventh lens 370 includes inflection points formed on opposing surfaces.

In the configuration described above, first lens 310 has the highest degree of positive refractive power, while sixth lens 360 has the highest degree of negative refractive power. In the example described above, an object-side surface of first lens 310 is more convex than surfaces of other lenses, while the image-side surface of third lens 330 is more concave than surfaces of other lenses. In the configuration described above, a paraxial region of first lens 310 is formed to be thicker than paraxial regions of other lenses. A paraxial region of the fifth lens 350 may be formed to be thinner than paraxial regions of other lenses. In the example described above, a distance between fifth lens 350 and sixth lens 360 is longer than that between other lenses. A distance between the first lens 310 and the second lens 320 and a distance between the sixth lens 360 and the seventh lens 370 may be shorter than that between other lenses.

The optical imaging system 300 further includes a filter 380, an image sensor 390, and a stop ST. Filter 380 is interposed between seventh lens 370 and image sensor 390, while stop ST is interposed between third lens 330 and fourth lens 340.

In optical imaging system 300, first lens 310 and seventh lens 370 may have a higher degree of refractive power than that of other lenses. In a manner different from the case described above, third lens 330, fourth lens 340, and fifth lens 350 may have a lower degree of refractive power than that of other lenses.

A refractive index of first lens 310, a refractive index of third lens 330, and a refractive index of sixth lens 360, in optical imaging system 300, may be less than or equal to 1.55. In this case, the refractive index of first lens 310 is substantially the same as that of third lens 330. The refractive index of second lens 320, the refractive index of fourth lens 340, the refractive index of fifth lens 350, and the refractive index of seventh lens 370, in optical imaging system 300, may be greater than or equal to 1.64. In this case, the refractive index of fourth lens 340 is substantially the same as that of fifth lens 350. In optical imaging system 300, second lens 320 may have substantially the highest refractive index, while first lens 310 may have substantially the lowest refractive index.

An effective diameter of a lens in optical imaging system 300 may be gradually reduced in a direction toward stop ST. For example, an effective diameter of fourth lens 340 disposed adjacently to stop ST is smaller than that of lenses adjacent thereto. Similarly based on the configuration described above, a lens disposed distantly from stop ST has a relatively large effective diameter. In an embodiment, seventh lens 370 disposed farthest from stop ST has the largest effective diameter.

Figure 8:
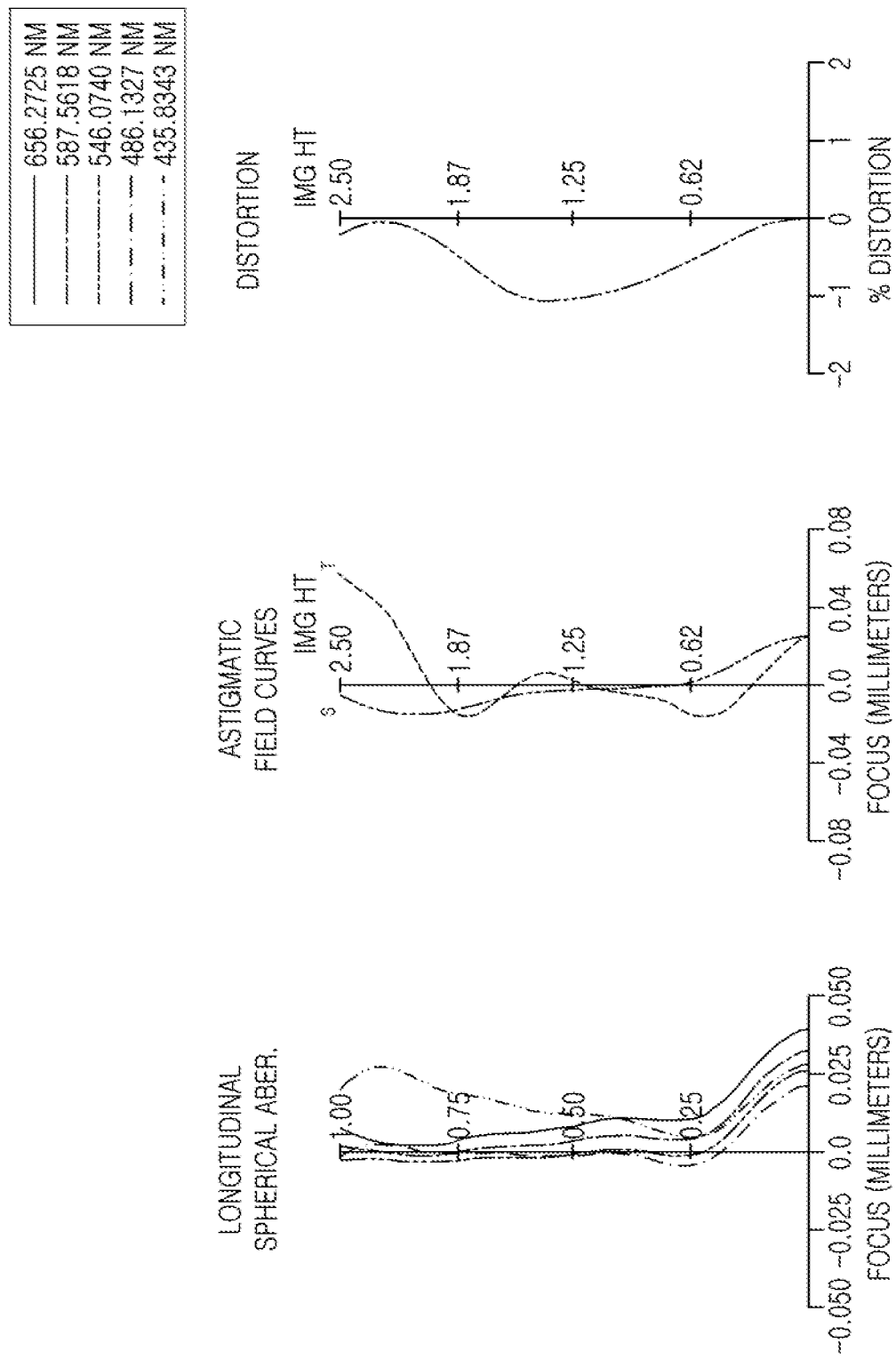
FIG. 8 is a set of graphs illustrating aberration curves of the optical imaging system illustrated in FIG. 7.
Figure 9:
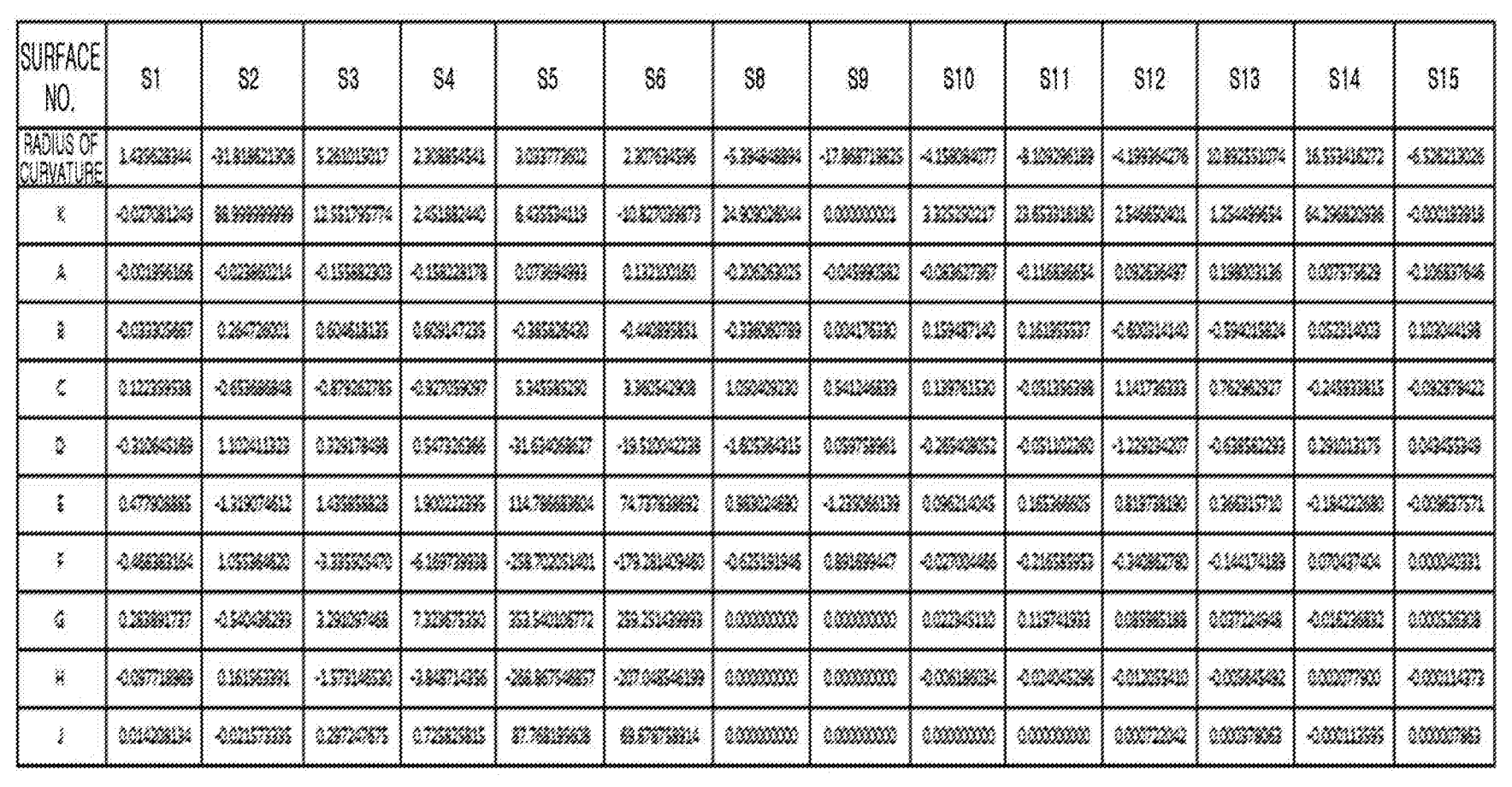

An optical imaging system having the configuration described above represents aberration characteristics as illustrated in the graphs of FIG. 8. FIG. 9 lists aspherical characteristics of the optical imaging system according to the example. Table 3 lists lens characteristics of the optical imaging system according to the example.

TABLE 3

Third Example f = 5.9976    TL = 5.199

IMG HT = 2.50

| Surface No. | | Radius of Curvature | Thickness/ Distance | Focal Length | Refractive Index | Abbe Number |
|---|---|---|---|---|---|---|
| S1 | First Lens | 1.3700 | 0.7970 | 2.460 | 1.537 | 55.8 |
| S2 | | −29.1200 | 0.1000 | | | |
| S3 | Second Lens | 4.3100 | 0.2000 | −5.770 | 1.684 | 20.4 |
| S4 | | 2.0000 | 0.1650 | | | |
| S5 | Third Lens | 3.3500 | 0.2630 | −11.180 | 1.537 | 55.8 |
| S6 | | 2.0900 | 0.1060 | | | |
| S7 | Stop | infinity | 0.1000 | | | |
| S8 | Fourth Lens | 10.9900 | 0.2000 | −8.550 | 1.641 | 23.9 |
| S9 | | 3.6300 | 0.3660 | | | |
| S10 | Fifth Lens | −18.1200 | 0.1770 | 263.370 | 1.641 | 23.9 |
| S11 | | −20.3700 | 0.8750 | | | |
| S12 | Sixth Lens | −3.4000 | 0.2000 | −4.850 | 1.546 | 56.0 |
| S13 | | 12.3100 | 0.1000 | | | |
| S14 | Seventh Lens | 15.2300 | 0.7000 | 6.300 | 1.657 | 21.5 |
| S15 | | −5.5800 | 0.1000 | | | |
| S16 | Filter | infinity | 0.1100 | | 1.519 | 64.2 |
| Imaging Plate | | infinity | 0.6400 | | | |

Figure 10:
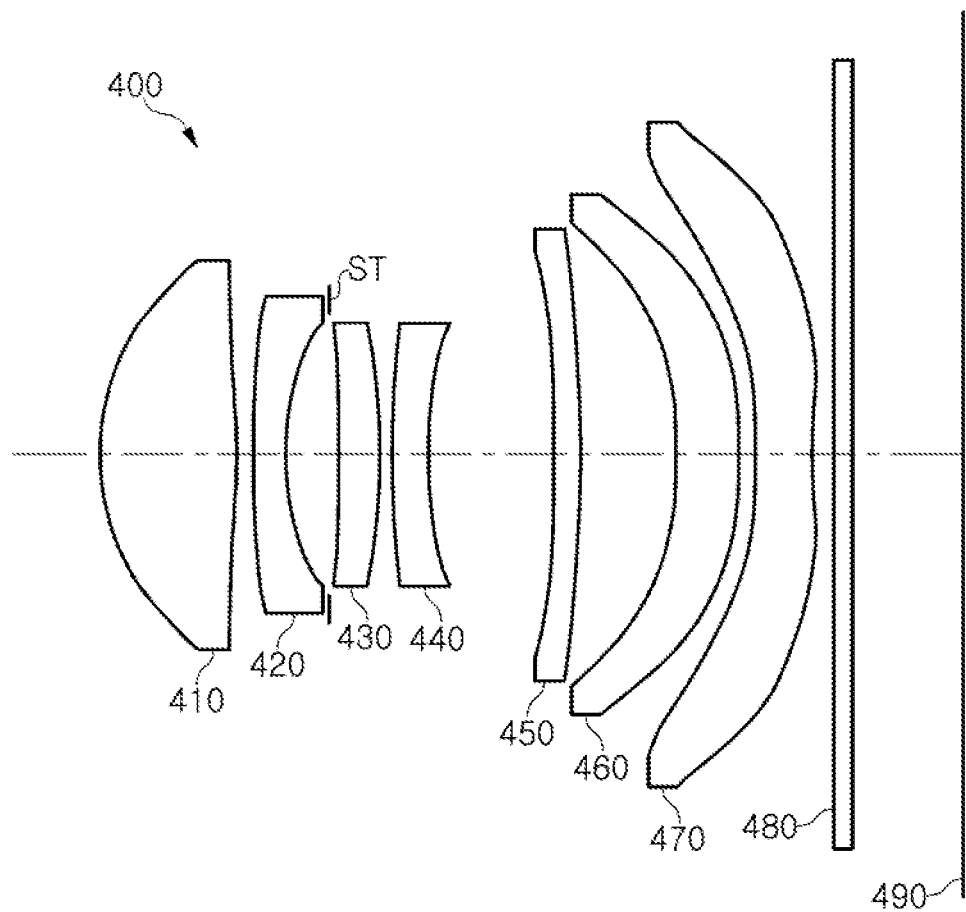
FIG. 10 is a diagram of an optical imaging system according to a fourth example.

An optical imaging system according to a fourth example will be described with reference to FIG. 10. An optical imaging system 400 includes a first lens 410, a second lens 420, a third lens 430, a fourth lens 440, a fifth lens 450, a sixth lens 460, and a seventh lens 470.

The first lens 410 has a positive refractive power and opposing convex surfaces. The second lens 420 has a negative refractive power, a convex object-side surface, and a concave image-side surface. The third lens 430 has a positive refractive power, a concave object-side surface, and a convex image-side surface. The fourth lens 440 has a negative refractive power, a convex object-side surface, and a concave image-side surface.

The fifth lens 450 has a positive refractive power, a concave object-side surface, and a convex image-side surface. The sixth lens 460 has a negative refractive power, a concave object-side surface, and a convex image-side surface. In addition, the sixth lens 460 includes inflection points formed on opposing surfaces. The seventh lens 470 has a negative refractive power and opposing concave surfaces. In addition, the seventh lens 470 includes inflection points formed on opposing surfaces.

In the configuration described above, first lens 410 has the highest degree of positive refractive power, while second lens 420 has the highest degree of negative refractive power. In the example described above, an object-side surface of first lens 410 is more convex than surfaces of other lenses, while the image-side surface of second lens 420 is more concave than surfaces of other lenses. In the configuration described above, a paraxial region of first lens 410 is formed to be thicker than paraxial regions of other lenses. A paraxial region of fifth lens 450 may be formed to be thinner than paraxial regions of other lenses. In the example described above, a distance between fourth lens 440 and fifth lens 450 is longer than that between other lenses. A distance between sixth lens 460 and seventh lens 470 or a distance between seventh lens 470 and an imaging plane may be shorter than that between other lenses.

The optical imaging system 400 further includes a filter 480, an image sensor 490, and a stop ST. Filter 480 is interposed between seventh lens 470 and image sensor 490, while stop ST is interposed between second lens 420 and third lens 430.

In optical imaging system 400, first lens 410 may have a higher degree of refractive power than that of other lenses. In a manner different from the example described above, third lens 430, fourth lens 440, and fifth lens 450 may have a relatively low degree of refractive power.

A refractive index of first lens 410, a refractive index of fourth lens 440, and a refractive index of seventh lens 470, in optical imaging system 400, may be less than or equal to 1.55. In this case, the refractive index of first lens 410 is substantially the same as that of fourth lens 440. The refractive index of second lens 420, the refractive index of third lens 430, the refractive index of fifth lens 450, and the refractive index of sixth lens 460, in optical imaging system 400, may be greater than or equal to 1.65. In this case, the refractive index of third lens 430, the refractive index of fifth lens 450, and the refractive index of sixth lens 460 are substantially the same. In optical imaging system 400, second lens 420 may have substantially the highest refractive index, while first lens 410 may have substantially the lowest refractive index. In optical imaging system 400, one of fourth lens 440 and fifth lens 450 may have a refractive index greater than or equal to 1.6, and the other may have a refractive index less than or equal to 1.6. Fourth lens 440 and fifth lens 450, having the configuration described above, increase an effect of aberration improvement An effective diameter of a lens in optical imaging system 400 may be gradually reduced in a direction toward stop ST. For example, an effective diameter of third lens 430 disposed adjacently to stop ST may be smaller than that of lenses adjacent thereto. In a manner consistent with the configuration described above, a lens disposed distantly from stop ST may have a relatively large effective diameter. For example, seventh lens 470 disposed farthest from stop ST has the largest effective diameter.

Figure 11:
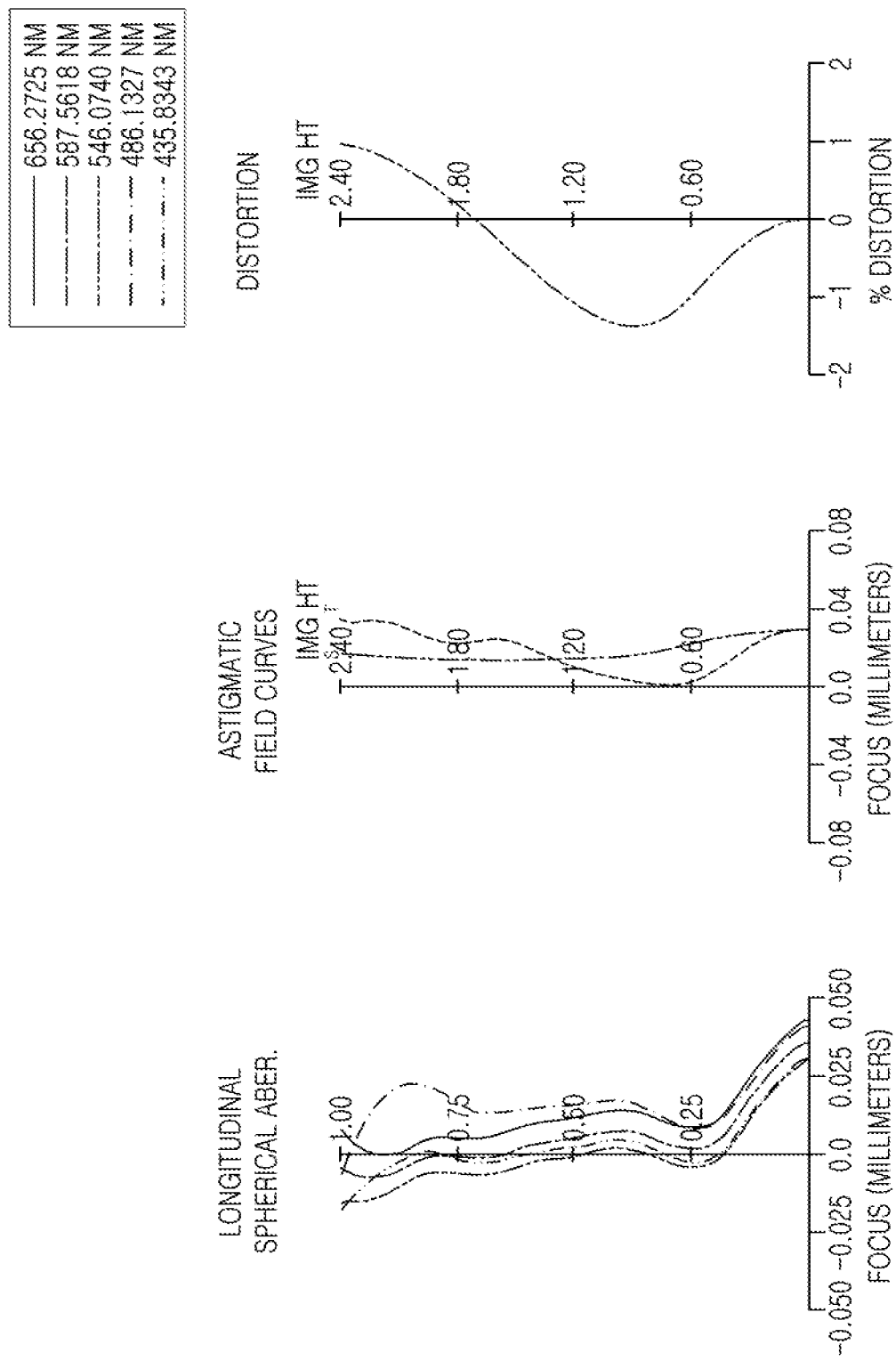
FIG. 11 is a set of graphs illustrating aberration curves of the optical imaging system illustrated in FIG. 10.
Figure 12:
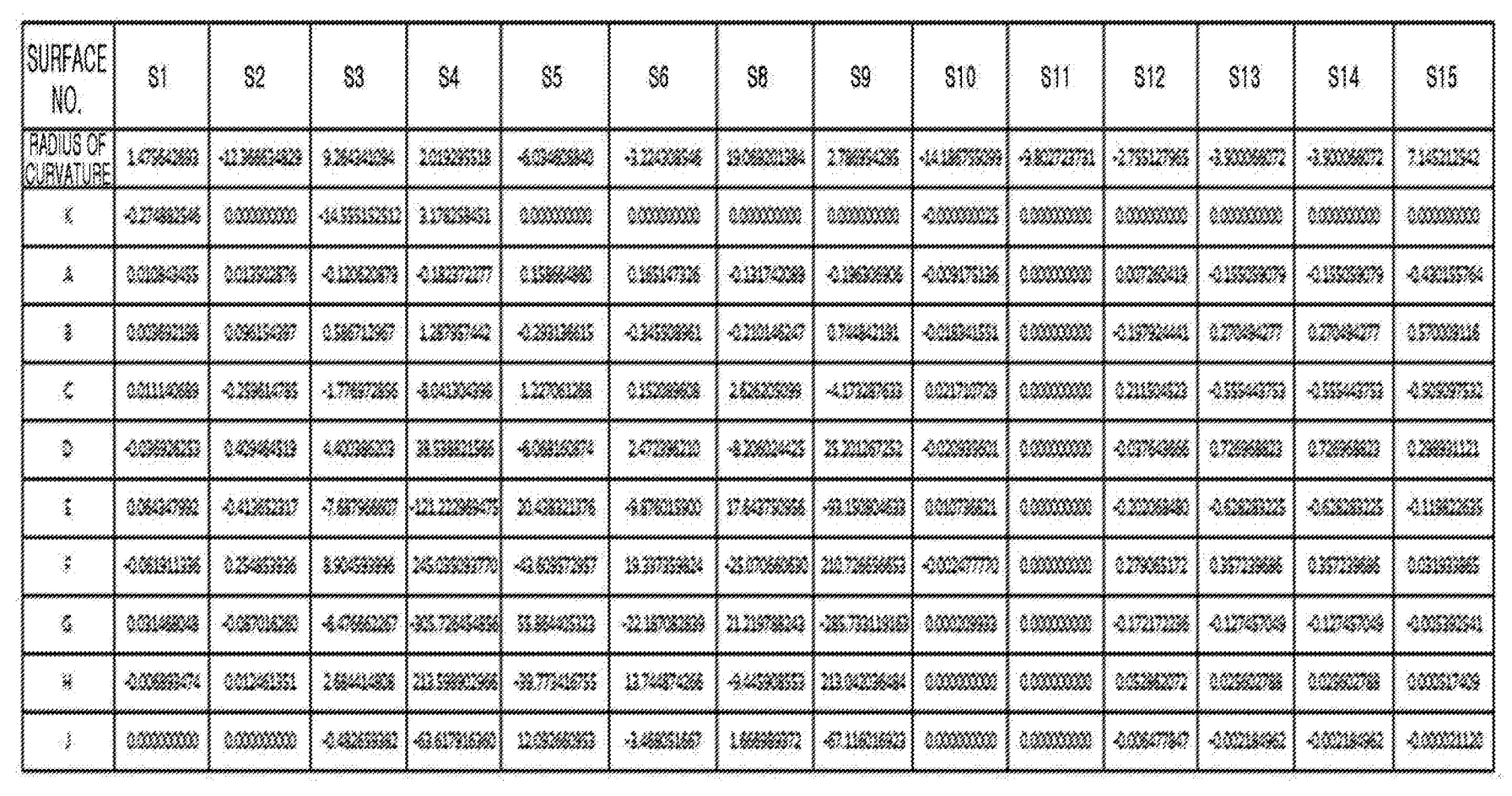

An optical imaging system having the configuration described above represents aberration characteristics as illustrated in the graphs of FIG. 11. FIG. 12 lists aspherical characteristics of the optical imaging system according to the example. Table 4 lists lens characteristics of the optical imaging system according to the example.

TABLE 4

Fourth Example f = 5.9976    TL = 5.296
IMG HT = 2.40

| Surface No. | | Radius of Curvature | Thickness/ Distance | Focal Length | Refractive Index | Abbe Number |
|---|---|---|---|---|---|---|
| S1 | First Lens | 1.4800 | 0.8110 | 2.460 | 1.546 | 56.0 |
| S2 | | −12.3700 | 0.1330 | | | |
| S3 | Second Lens | 9.2600 | 0.2000 | −3.910 | 1.684 | 20.4 |
| S4 | | 2.0200 | 0.2220 | | | |
| S5 | Third Lens | infinity | 0.1000 | | | |
| S6 | | −6.0300 | 0.2480 | 10.180 | 1.657 | 21.5 |
| S7 | Stop | −3.2200 | 0.1000 | | | |
| S8 | Fourth Lens | 19.0700 | 0.2000 | −6.000 | 1.546 | 56.0 |
| S9 | | 2.7900 | 0.7690 | | | |
| S10 | Fifth Lens | −14.1900 | 0.1640 | 47.550 | 1.657 | 21.5 |
| S11 | | −9.8000 | 0.5920 | | | |
| S12 | Sixth Lens | −2.7600 | 0.3850 | −24.760 | 1.657 | 21.5 |
| S13 | | −3.5000 | 0.1000 | | | |
| S14 | Seventh Lens | −17.6100 | 0.3770 | −9.25 | 1.546 | 56.0 |
| S15 | | 7.1500 | 0.1000 | | | |
| S16 | Filter | infinity | 0.1100 | | 1.519 | 64.2 |
| Imaging Plate | | infinity | 0.6850 | | | |

Table 5 illustrates values of Conditional Equations of the optical imaging system according to first to fourth examples.

TABLE 5

| Conditional Equation | First Example | Second Example | Third Example | Fourth Example |
|---|---|---|---|---|
| TL/f | 0.8670 | 0.8587 | 0.8670 | 0.8837 |
| BFL/f | 0.1334 | 0.1334 | 0.1417 | 0.1493 |
| f/(IMG HT) | 2.181 | 2.181 | 2.399 | 2.499 |
| Nd7 | 1.657 | 1.657 | 1.657 | 1.546 |
| f5/f | −2.2628 | −0.9455 | −43.9127 | 7.9280 |
| f/EPD | 2.40 | 2.60 | 2.60 | 2.40 |

Figure 13:
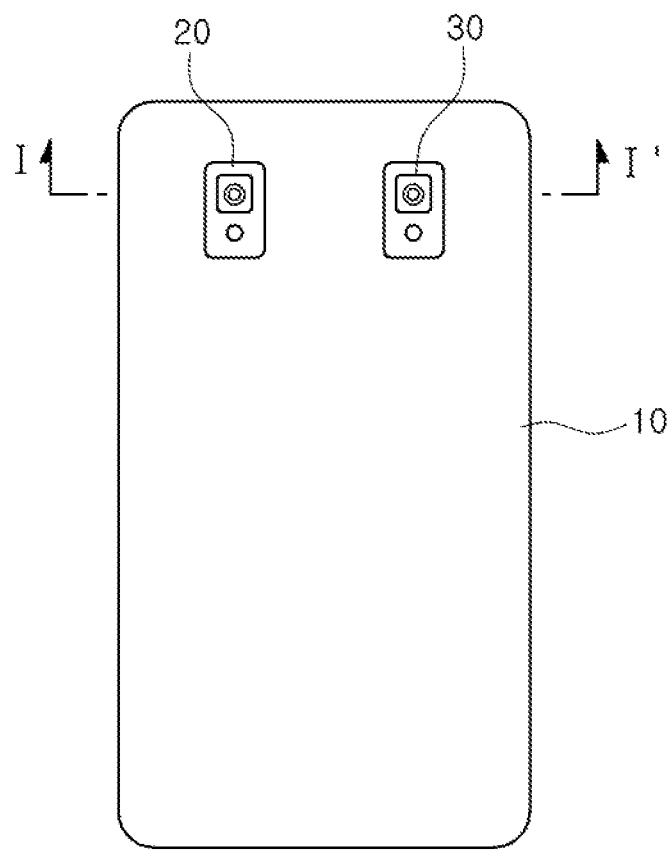
FIG. 13 is a rear view of a portable terminal including an optical imaging system mounted therein according to an example.
Figure 14:
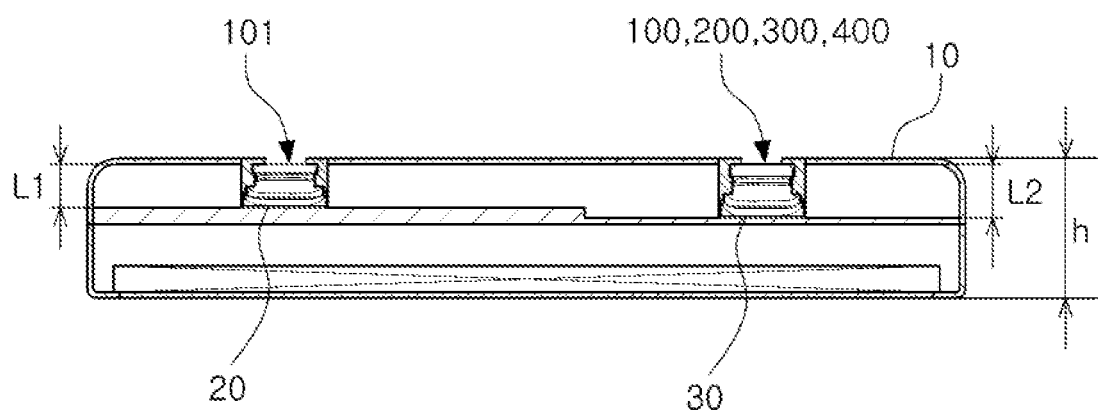
FIG. 14 is a cross-sectional view of the portable terminal illustrated in FIG. 13.

Hereinafter, a portable terminal including an optical imaging system mounted therein, according to an example, will be described with reference to FIGS. 13 and 14. A portable terminal 10 includes a plurality of camera modules 20 and 30. A first camera module 20 includes a first optical imaging system 101 configured to capture an image of a subject at a short distance. A second camera module 30 includes second optical imaging systems 100, 200, 300, and 400, configured to capture an image of a distant subject.

The first optical imaging system 101 includes a plurality of lenses. For example, first optical imaging system 101 includes four or more lenses. First optical imaging system 101 is configured to capture images of objects at short distance. In detail, first optical imaging system 101 has a relatively wide angle of view of 50° or more, while a ratio (TL/f) thereof may be higher than or equal to 1.0.

The second optical imaging systems 100, 200, 300, and 400 include a plurality of lenses. For example, second optical imaging systems 100, 200, 300, and 400 include seven lenses. Second optical imaging systems 100, 200, 300, and 400 may be provided as one optical imaging system among optical imaging systems according to the first to fourth examples described above. Second optical imaging systems 100, 200, 300, and 400 may be configured to capture an image of a distant object. In detail, second optical imaging systems 100, 200, 300, and 400 have an angle of view of 40° or less, while a ratio (TL/f) thereof may be below 1.0.

First optical imaging system 101 and second optical imaging systems 100, 200, 300, and 400 may have substantially the same size. In some embodiments, an overall length L1 of first optical imaging system 101 is substantially the same as an overall length L2 of second optical imaging systems 100, 200, 300, and 400. Alternatively, a ratio (L1/L2) of the overall length L1 of first optical imaging system 101 to the overall length L2 of second optical imaging systems 100, 200, 300, and 400 is from 0.8 to 1.0. As a further alternative, a ratio (L2/h) of the overall length L2 of second optical imaging systems 100, 200, 300, and 400 to a thickness h of portable terminal 10 may be less than or equal to 0.8.

As set forth above, according to examples, an optical imaging system capable of capturing images of distant objects and being mounted in a small terminal is provided. While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a first lens, a second lens, a third lens, a fourth lens, a fifth lens, a sixth lens, and a seventh lens, sequentially disposed from an object side to an imaging plane,
   wherein the fourth lens and the fifth lens have negative refractive power, and the seventh lens has positive refractive power, and
   wherein the focal length of the first lens is within a range of 2.2 to 2.8 mm.

2. The optical imaging system of claim 1, wherein the first lens has a convex image-side surface along an optical axis.

3. The optical imaging system of claim 1, wherein the second lens has a convex object-side surface along an optical axis.

4. The optical imaging system of claim 1, wherein the third lens has a convex object-side surface along an optical axis.

5. The optical imaging system of claim 1, wherein the fourth lens has a meniscus form in which one side surface is concave along an optical axis, and the other side surface is convex along the optical axis.

6. The optical imaging system of claim 1, wherein the fifth lens has a concave object-side surface along an optical axis.

7. The optical imaging system of claim 1, wherein the sixth lens has a concave object-side surface and an opposing concave image-side surface along an optical axis.

8. The optical imaging system of claim 1, wherein the seventh lens has a convex object-side surface and an opposing convex image-side surface along an optical axis.

9. An optical imaging system, comprising:
first to seventh lenses, sequentially disposed from an object side to an imaging plane, wherein a ratio (TL/f) of a distance TL from an object-side surface of the first lens to an imaging plane to an overall focal length f is lower than or equal to 1.0,
wherein the focal length of the first lens is within a range of 2.2 to 2.8 mm.

10. The optical imaging system of claim 9, wherein the optical imaging system satisfies the following expression:

$BFL/f<0.15$ where BFL represents a distance from an image-side surface of the seventh lens to an imaging plane.

11. The optical imaging system of claim 9, wherein the optical imaging system satisfies the following expression:

$0.1<f/(IMG\ HT)<2.5$ where IMG HT is a half diagonal length of the imaging plane.

12. The optical imaging system of claim 9, wherein the optical imaging system satisfies the following expression:

$1.5<Nd7<1.7$ where Nd7 represents a refractive index of the seventh lens.

13. The optical imaging system of claim 9, wherein the optical imaging system satisfies the following expression:

$-45<f5/f<45$ where f5 represents a focal length of a fifth lens.

14. The optical imaging system of claim 9, wherein the optical imaging system satisfies the following expression:

$2.0<f/EPD<2.8$ where EPD represents a diameter of an entrance pupil.

15. The optical imaging system of claim 9, wherein a second lens, a fourth lens, and a sixth lens each have a negative refractive power.

16. The optical imaging system of claim 9, wherein a sixth lens has a concave object-side surface along an optical axis.

17. An optical imaging system, comprising:
a first lens comprising a positive refractive power, a convex object-side surface along an optical axis, and a convex image-side surface along the optical axis;
a second lens to sixth lens; and
a seventh lens comprising a positive refractive power, a convex object-side surface along the optical axis and a convex image-side surface along the optical axis,
wherein the first lens to seventh lens are sequentially disposed from an object side to an imaging plane, and
wherein the first lens to seventh lens are disposed adjacent to one another.

18. The optical imaging system of claim 17, wherein the object-side surface of the first lens comprises a most convex point of the optical imaging system.

* * * * *